(12) United States Patent
Dooley et al.

(10) Patent No.: US 8,907,843 B2
(45) Date of Patent: Dec. 9, 2014

(54) PROCESSING OF SATELLITE POSITIONING SYSTEM SIGNALS

(75) Inventors: Saul Robin Dooley, Reigate (GB); Andrew Thomas Yule, East Grinstead (GB)

(73) Assignee: U-Blox AG, Thalwil (CH)

( * ) Notice: Subject to any disclaimer, the term of this patent is extended or adjusted under 35 U.S.C. 154(b) by 494 days.

(21) Appl. No.: 12/666,287

(22) PCT Filed: Jun. 24, 2008

(86) PCT No.: PCT/EP2008/058042
§ 371 (c)(1),
(2), (4) Date: Dec. 22, 2009

(87) PCT Pub. No.: WO2009/000842
PCT Pub. Date: Dec. 31, 2008

(65) Prior Publication Data
US 2010/0171658 A1 Jul. 8, 2010

(30) Foreign Application Priority Data
Jun. 26, 2007 (EP) ..................................... 07111057

(51) Int. Cl.
*G01S 19/24* (2010.01)
*G01S 19/03* (2010.01)
*G01S 19/09* (2010.01)
*G01S 5/00* (2006.01)

(52) U.S. Cl.
CPC ............... *G01S 5/0036* (2013.01); *G01S 19/24* (2013.01)
USPC ............... 342/357.63; 342/357.4; 342/357.46

(58) Field of Classification Search
CPC ..................................................... G01S 19/09
USPC .......... 342/357.2–357.78; 701/540, 484–485, 701/468
See application file for complete search history.

(56) References Cited

U.S. PATENT DOCUMENTS 6,078,290 A * 6/2000 McBurney et al. ........... 342/417
6,417,801 B1 7/2002 van Diggelen
(Continued)

FOREIGN PATENT DOCUMENTS

EP 1 160 582 A2 12/2001
WO WO 00/58750 10/2000
(Continued)

OTHER PUBLICATIONS

Kaplan, E.D. (editor), *Understanding GPS—Principles and Applications*, Section 5.1.7, Artech House, 1996, pp. 119-208.
(Continued)

*Primary Examiner* — Dao Phan
(74) *Attorney, Agent, or Firm* — Blakely Sokoloff Taylor & Zafman

(57) ABSTRACT

A method of processing signals from a satellite positioning system, comprises receiving (50) recorded blocks of data samples of satellite broadcast, each block including one or more timestamps generated within a receiver at which the samples were recorded, and processing (52) the recorded blocks of data samples using a first set of processing parameters to identify satellite transmissions contained within the blocks. Based on the results of the processing (52), one of the blocks is selected (56,58). The selected block is processed (60) using a second set of processing parameters to derive at least position and satellite broadcast timing information. The timestamp of the selected block and the timing information obtained from the processing (60) of the selected block is used to assist in the processing (60) of the other blocks. The method associates timestamps with satellite data to improve the offline processing of the positioning data (for example by providing accurate relative timing information between data samples), and this can reduce the processing power and/or time to process the data.

17 Claims, 3 Drawing Sheets

(56) References Cited

U.S. PATENT DOCUMENTS

| | | |
|---|---|---|
| 6,449,485 B1 | 9/2002 | Anzil |
| 6,449,486 B1 | 9/2002 | Rao |
| 6,778,135 B2 * | 8/2004 | Warloe et al. ............ 342/357.63 |
| 8,102,312 B2 * | 1/2012 | Bromley et al. ......... 342/357.77 |
| 2007/0211143 A1 * | 9/2007 | Brodie et al. ................. 348/141 |
| 2009/0002234 A1 * | 1/2009 | Normark et al. ......... 342/357.15 |

FOREIGN PATENT DOCUMENTS

| | | |
|---|---|---|
| WO | WO 2005/047922 A1 | 5/2005 |
| WO | WO 2006/018803 A1 | 2/2006 |

OTHER PUBLICATIONS

Lehtinen, A., "Doppler Positioning with GPS," Tampere University of Technology, Dept. of Electrical Engineering, 2002.

English translation of Japanese Office Action for JP App. No. 2010-513896 mailed Feb. 8, 2013.

* cited by examiner

PROCESSING OF SATELLITE POSITIONING SYSTEM SIGNALS

This is a non-provisional application claiming the benefit of International application number PCT/EP2008/058042 filed Jun. 24, 2008.

FIELD OF THE INVENTION

This invention relates to satellite positioning systems, such as GPS, and in particular relates to the processing of the signals within such a system.

BACKGROUND OF THE INVENTION

The global positioning system is a satellite-based navigation system consisting of a network of up to 32 orbiting satellites (called space vehicles, "SV") that are in six different orbital planes. 24 satellites are required by the system design, but more satellites provide improved coverage. The satellites are constantly moving, making two complete orbits around the Earth in just under 24 hours.

Each satellite transmits on several frequencies. Civilian GPS receivers currently use the 'L1' frequency of 1575.42 MHz. The satellite orbits are roughly 25,000 kilometers from the earth's centre, or 20,000 kms above the earth's surface. The orbital paths of these satellites take them between roughly 60 degrees North and 60 degrees South latitudes.

The GPS signals transmitted by the satellites are of a form commonly known as Direct Sequence Spread Spectrum employing a pseudo-random code which is repeated continuously in a regular manner. The satellites broadcast several signals with different spreading codes including the Coarse/Acquisition or C/A code, which is freely available to the public, and the restricted Precise code, or P-code, usually reserved for military applications. The C/A code is a 1,023 bit long pseudo-random code broadcast with a chipping rate of 1.023 MHz, repeating every millisecond. Each satellite sends a distinct C/A code, which allows it to be uniquely identified.

A data message is modulated on top of the C/A code by each satellite and contains important information such as detailed orbital parameters of the transmitting satellite (called ephemeris), information on errors in the satellite's clock, status of the satellite (healthy or unhealthy), current date, and time. This part of the signal is essential to a GPS receiver determining an accurate position. Each satellite only transmits ephemeris and detailed clock correction parameters for itself and therefore an unaided GPS receiver must process the appropriate parts of the data message of each satellite it wants to use in a position calculation.

The data message also contains the so called almanac, which comprises less accurate information about all the other satellites and is updated less frequently. The almanac data allows a GPS receiver to estimate where each GPS satellite should be at any time throughout the day so that the receiver can choose which satellites to search for more efficiently. Each satellite transmits almanac data showing the orbital information for every satellite in the system.

A conventional GPS receiver reads the transmitted data message and saves the ephemeris, almanac and other data for continual use. This information can also be used to set (or correct) the clock within the GPS receiver.

To determine position, the GPS receiver compares the time a signal was transmitted by a satellite with the time it was received by the GPS receiver. The time difference tells the GPS receiver how far away that particular satellite is. By combining distance measurements from multiple satellites, position can be obtained by trilateration. With a minimum of three satellites, a GPS receiver can determine a latitude/longitude position (a 2D position fix). With four or more satellites, a GPS receiver can determine a 3D position which includes latitude, longitude, and altitude.

By processing the apparent Doppler shifts of the signals from the satellites, a GPS receiver can also accurately provide speed and direction of travel (referred to as 'ground speed' and 'ground track').

A complete data signal from the satellites consists of a 37,500 bit Navigation Message, which takes 12.5 minutes to send at 50 bps. The data signal is divided into 25 30 s frames, each having 1500 bits, and these are divided into five 6 s subframes. Each 6 s subframe is divided into ten 30 bit words. All the information necessary for a position fix (ephemeris etc) is contained within each frame and so a GPS receiver will typically take around 30 s to produce a position fix from a so-called cold start.

The first word of each 6 s subframe contains a preamble to enable receivers to recognise the start of the subframe. The next word is the handover word which gives timing information since the last restart of GPS time (which takes place every Saturday/Sunday at midnight). The remaining 8 words provide the ephemeris, almanac and clock information, depending on the subframe.

The first subframe gives clock correction data, the second and third subframes give ephemeris data and the almanac data is in the fourth and fifth subframes.

The SVs all broadcast on the same frequency. In order to distinguish a signal from a particular satellite, the receiver needs to generate a replica of the C/A code known to be in use by that satellite and align it so that it is synchronised with the incoming signal which will be delayed by an unknown amount predominantly due to the time of flight of the signal in travelling from the satellite to the receiver (typically around 0.07 s). In general it is not possible for a receiver to accurately predict the alignment necessary to get the replica in sync with the incoming signal, so some form of search is required, with a number of alignments being tried in turn and the best match being selected. This process of evaluating a number of candidate alignments is normally termed correlation as the receiver implements a correlation function between the received signal and the known C/A code for each satellite in turn, to determine if the received signal includes a component having the C/A code from a particular SV. The correlation function has to be calculated for multiple relative timings, and when the correlation peak is found, this corresponds to a particular timing and a particular SV. The discovered timing in turn corresponds to a particular distance from the SV.

The determined code phase, i.e. the timing of the peak of the correlation function, reveals the accurate timing information for use in the distance calculation. However, as the code is repeated every millisecond, the coarse timing also needs to be determined. Typically, less frequently repeating data components are used for the more coarse timing evaluation (i.e. to enable GPS time to be derived), such as the individual bits of the 50 bps data message and specific parts of it such as the subframe preamble or subframe handover word.

The integration period over which the correlation function is performed determines how easily a signal encoded with a particular code can be identified; in general, the longer the integration period, the more reliably the correct code phase should be reported for a given signal strength. The weaker the signal to be detected, the longer the integration period needs to be to achieve the same level of reliability.

Nearly all current and historical GPS receivers work by processing signals from the satellites in "real time", as they come in, reporting the position of the device at the current time. Techniques associated with such conventional receivers are well known.

Such "conventional" GPS receivers invariably comprise:
an antenna suitable for receiving the GPS signals,
analogue RF circuitry (often called a GPS front end) designed to amplify, filter, and mix down to an intermediate frequency (IF) the desired signals so they can be passed through an appropriate analogue-to-digital (A/D) convertor at a sample rate normally of the order of a few MHz,
digital signal processing hardware that carries out the correlation process on the IF data samples generated by the A/D converter, normally combined with some form of micro controller that carries out the "higher level" processing necessary to control the signal processing hardware and calculate the desired position fixes However, the less well known concept of "Store and Process Later" has also been investigated. This involves storing the IF data samples collected by a conventional antenna and analogue RF circuitry in some form of memory before processing them at some later time (seconds, minutes, hours or even days) and often at some other location, where processing resources are greater.

The key advantages of the Store and Process Later approach over conventional GPS receivers are that the cost and power consumption of the capturing device are kept to a minimum as no digital signal processing needs be done at the time of capture, and the grabs can be very short (e.g. 100 ms). If the subsequent signal processing is done when the relevant satellite data (ephemeris etc) can be obtained via some other method, this approach also removes the need to decode the (very slow) data message from the SVs in the capturing device, which in many cases leads to unacceptably long times to start up conventional devices.

For example, a number of small capture devices which store short "grabs" of IF data samples into memory can subsequently upload their IF data grabs to a shared central computer which would not only carry out the necessary signal processing (correlation etc), but would also have access to a database of recent satellite information (ephemeris etc) by being connected to one or more conventional GPS receivers which relayed key parts of the GPS data message they received to the central computer.

However, the ease and effectiveness of subsequent processing is affected by the manner in which the IF data is collected. It is desirable to store as little data as possible to reduce memory and processing requirements, but this makes obtaining a position fix more difficult.

SUMMARY OF THE INVENTION

According to the invention, there is provided a method of processing signals from a satellite positioning system, comprising:
receiving recorded blocks of data samples of satellite broadcast, each block including one or more timestamps generated within a receiver at which the samples were recorded;
processing the recorded blocks of data samples using a first set of processing parameters to identify satellite transmissions contained within the blocks;
based on the results of the processing, selecting one of the blocks;
processing the selected block using a second set of processing parameters to derive at least position and satellite broadcast timing information; and
using the timestamp of the selected block and the timing information obtained from the processing of the selected block to assist in the processing of the other blocks.

The method of the invention associates timestamps with satellite data (for example intermediate frequency "IF" data) to improve the offline processing of the positioning data, and this can reduce the processing power and/or time to process the data.

The positioning system is typically a GPS system.

Blocks of (e.g. IF) data from a GPS front end are recorded along with associated timestamps, and the subsequent processing of such IF data uses the timestamps to determine absolute and/or relative timing, so as to facilitate more efficient or effective calculation of position or velocity.

Using the timestamp of the selected block and the timing information obtained from the processing of the selected block can comprise predicting the timing information for the other blocks using the relative timing between the timestamps of the selected block and the other blocks. This relative timing based on the locally generated timestamps can be accurate enough to enables processing the subsequent blocks with a known smaller timing window.

The position information obtained from the processing of the selected block can be used to predict the approximate location at which the other blocks were recorded, and this can again be used to simplify the processing of the other blocks.

Processing the selected block using a second set of processing parameters also derives the satellite broadcast frequency, the satellite broadcast frequency for the other blocks can also be predicted from the derived frequency for the selected block, so that no (or a smaller) frequency sweep is needed for processing the subsequent blocks.

The processing of each other block of data can uses the timestamp of one or more previously processed blocks of data and the corresponding position and timing information to assist in the processing. Thus, processing one block can use one or more previously obtained data.

The samples may comprise intermediate frequency down-converted data samples.

Processing using a first set of processing parameters may comprise using a shorter integration period to identify satellite transmissions than used in the second set of processing parameters. The shorter integration period can for example be less than 5 ms, more preferably 2 ms or less. Each recorded sample can have a duration of less than 500 ms.

The processing of the samples using the first and second sets of processing parameters may comprise accessing a database to obtain ephemeris information at times corresponding to the timestamps. This is used to access a separately built up database of historical ephemeris (and other SV parameters), and thereby reduces the amount of data which needs to be received from the receiver.

The method of the invention departs from the conventional approach of processing the GPS data in sequence, and provides a processing of the data in an order which gives greatest savings in processing power. Thus, the first sample processed in order to obtain a position fix may not be the first recorded sample.

The invention also provides a method of processing signals from a satellite positioning system, within a receiver, comprising:
recording blocks of data samples of satellite broadcast;
generating a local timestamp at which the blocks were recorded;
providing the recorded blocks of data samples and local timestamps to a processing system.

The invention also provides a system for collecting data from a satellite positioning system, comprising:
an antenna;
a receiver front end, which has as output digitised intermediate frequency signals;
a memory device;
a local timer;
a controller; and
a transfer means, wherein the controller is adapted to store in the memory the front end signals with associated timestamps generated by the local timer, and the transfer means is adapted to provide the recorded samples and local timestamps to a processing system.

BRIEF DESCRIPTION OF THE DRAWINGS

Examples of the invention will now be described in detail with reference to the accompanying drawings, in which.

DETAILED DESCRIPTION OF THE INVENTION

The invention provides a method of processing stored satellite positioning system data, such as GPS data. This can be used in many store and process applications, where it is desirable for the receiver to have the GPS signal processing capability removed, and for this to be implemented remotely.

The invention makes use of timing markers associated with recorded GPS samples so that the processing of multiple samples can be made more efficient, by taking advantage of known relative timings between the samples.

Figure 1:
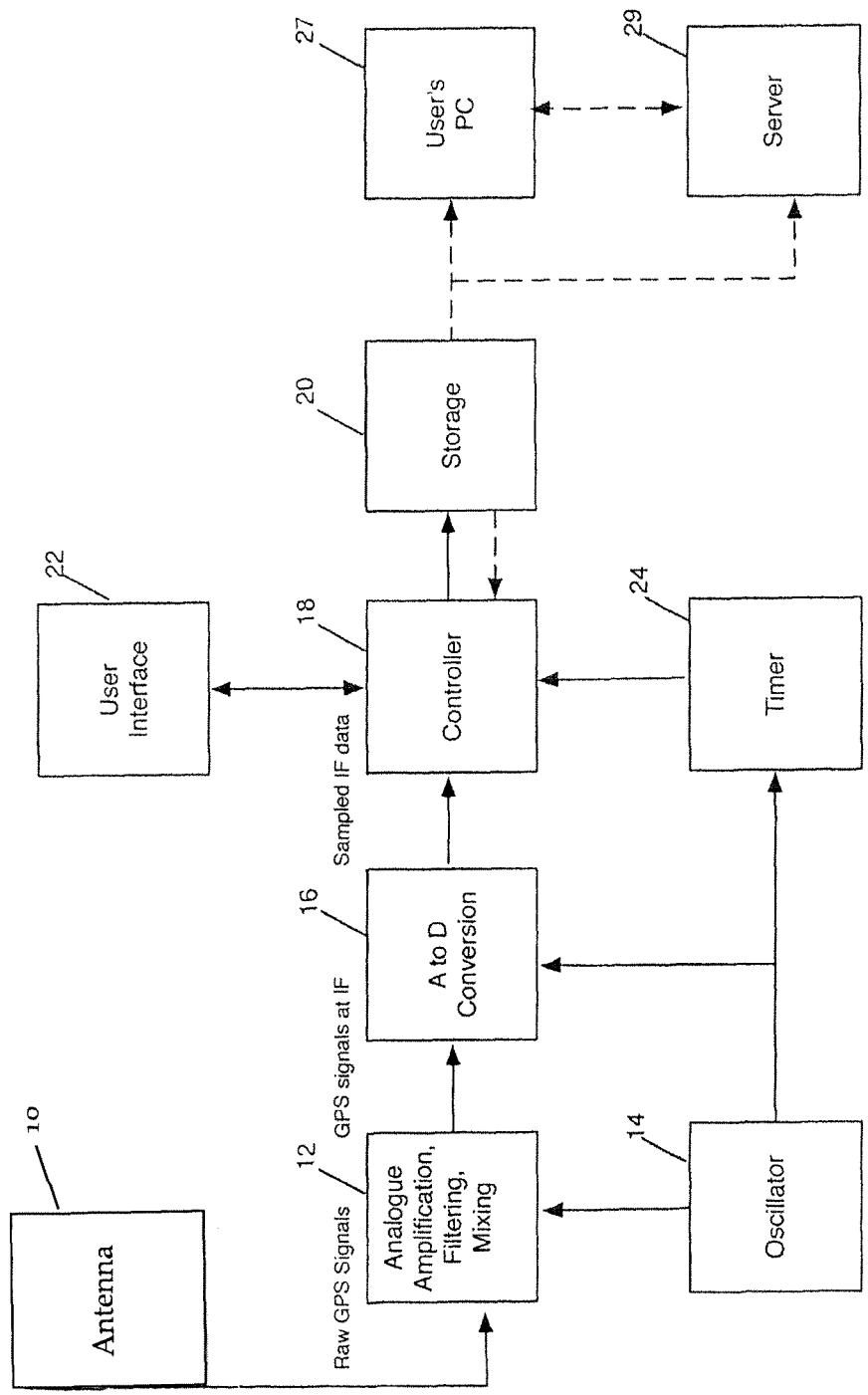
FIG. 1 shows a system of the invention.

To illustrate the invention, an example will be given of a sports tracking device, for tracking sportsmen such as runners. The key components of the device are illustrated in FIG. 1.

The signals from the GPS satellites are received by the antenna 10 and then put through conventional analogue processing, typically comprising a combination of amplification, filtering and down mixing in unit 12 driven by a reference oscillator 14 (normally a temperature compensated crystal), followed by A/D conversion in unit 16. This is the conventional radio receiver electronics forming the RF front end.

A controller 18, implemented as discrete logic or a microprocessor with associated firmware, selects portions of the sampled IF data generated by the RF front end to be stored in the storage device 20, for example a flash RAM, hard disc etc. The manner in which it does this is influenced by settings from the user (as input by the a GUI 22) and the use of a timer 24 which can also be driven by the oscillator 14 as shown.

The timer 24 can be as simple as a counter driven by the oscillator which only runs when the device is active, or it could be a real-time clock (RTC) which keeps date and time even when the device is otherwise turned off. It may have a separate oscillator to minimise "off" energy usage.

When activated, the device records short blocks of IF data from the RF front end (these short blocks are termed "grabs" in the following description) along with an associated timestamp from the timer 24. These grabs may be for example 100 ms long and they could be recorded once every 10 s. The exact values used could be varied explicitly or implicitly by the user via the GUI 22.

In different applications, different length grabs will be appropriate. Typically, each grab will be shorter than the subframe duration of 6 s, and preferably less than 500 ms.

A short grab can enable a code phase measurement to be obtained. However, in a standard GPS receiver, a code phase measurement is ambiguous (as noted above)—it indicates what fraction of a ms the delay is but not the integer number of ms.

This ambiguity can be resolved in a number of ways:
1) Try all possible delays. SVs tend to be about 20,000 km from the surface of the Earth. In practice, this means that delays observed from the Earth are in the range roughly 65 ms to 85 ms. In theory, all the possible values could be tried (~21 per SV), in the hope that only one gives a sensible result. However, as at least 4 SVs are needed, the number of permutations gets very high very quickly, and more than one set of delays may still be plausible.
2) Establish where the bit edge is. The data bit is 20 ms long (50 bps=>0.02 s/bit) and is aligned with the C/A code so that each data bit is aligned with 20 complete repeats of the 1 ms code. If it can be determined on which code epoch the bit edge occurs, then there is a delay measurement which is ambiguous to 20 ms rather than 1 ms before. This effectively reduces the ambiguity to no more that 2 possible values per SV (in many cases there is no ambiguity) and trying all the permutations becomes perfectly plausible. The only difficulty is how to establish the bit edge. In principal they occur every 20 ms, but only if the data bits change. If there is a long sequence of 1s or 0s then there is no bit edge to detect. Furthermore, for weak signals it may be desired to see several bit edges to be sure you've got it right. Therefore, it may often be necessary to process up to 1 s of data to guarantee a reliable answer.
3) Establish where you are in the data message. Ideally, the code phase and the bit edge should be determined, and also the data message and the Hand Over Word value from word 2 of each subframe should be parsed. To do this, it has to be established where word 2 is, and this means recognising various features of the message (such as the preamble in word 1). This can normally be done with around 6 s of data (depending where you start) but around 12 s of data is required to be absolutely sure, so that two consecutive subframes are obtained with preambles and consecutive HOW values).

As a further complication, solutions 1) & 2) above don't give the absolute time that the signal left the SV, and therefore a guess needs to be made when calculating the position of the SV. As the SVs move quite fast, getting it right to within 0.1 s (or 0.01 s preferably) is important.

Figure 2:
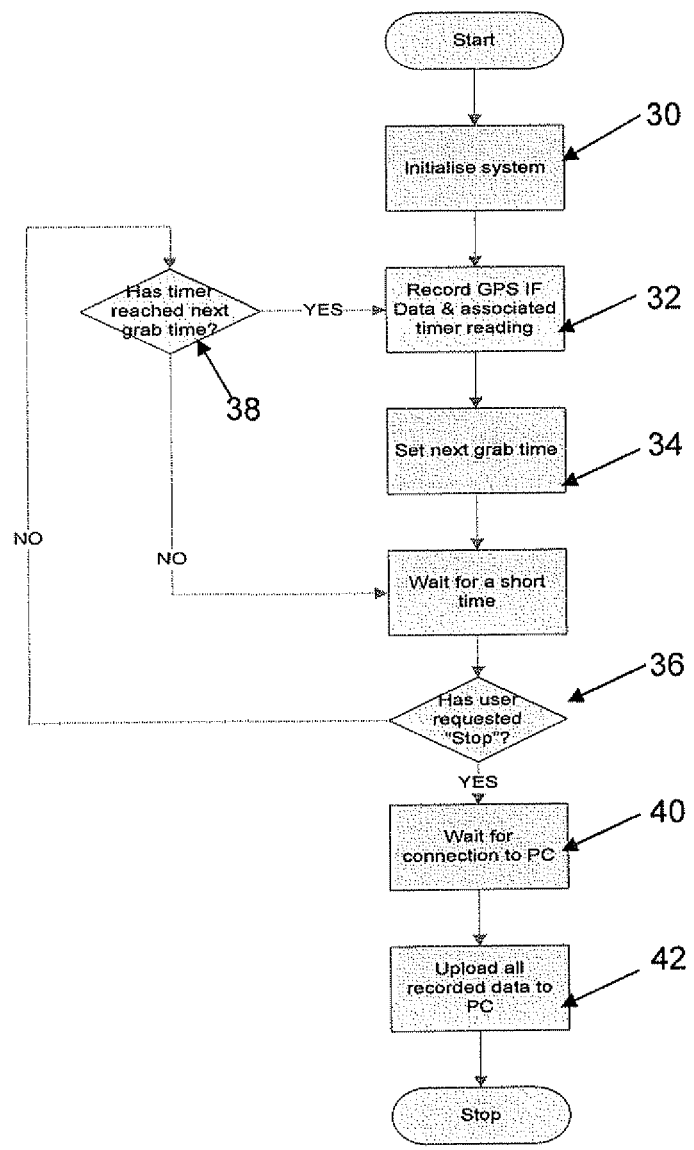
FIG. 2 shows a data recording method used in the system of the invention.

The logic that the controller implements is explained with reference to FIG. 2.

The "Initialise system" step 30 involves selecting how long each grab should be and what the period between grabs is.

The GPS IF data of one grab is stored in step 32, and the timing for the next grab is determined in step 34.

Periodically, there is a test in step 36 to see if the user has instructed the data recording to stop or if the time for the next grab has been reached (step 38). While the time for the next grab has not been reached, the system is in a waiting mode, but monitoring if the recording is stopped.

Step 40 monitors if data can be downloaded, and step 42 relates to the uploading of the recorded grabs to a PC for subsequent processing.

In this case, the processing on a PC would aim to establish the movement of the device whilst it was active. This would be done by processing each of the grabs in order to detect as many SVs as possible and for those SVs to determine code phases/pseudoranges and Doppler shifts as accurately as possible. These measurements from each grab, in association with ephemeris and other constellation data download, can be submitted to a GPS position/velocity fix calculation to get a position/velocity fix for each grab.

The measurements for all grabs could however be submitted to a tracking filter (such as a Kalman Filter) in order to obtain a smoother track.

In its simplest form, detecting as many SVs as possible involves carrying out a well known two-dimensional code/carrier search (for example reference is made to "Understanding GPS—Principles and Applications, Ed. E. D Kaplan, Artech House, Section 5.1.7—ISBN 0-89006-793-7) for all 32 SVs, with the length of the chosen integration period providing a limit to sensitivity. In practice, using additional information to restrict the size of the search helps with both efficiency and reliability of results.

It is possible to process each of the grabs completely independently. However, the invention proposes the use of information extracted from one to aid others, and this produces better results more efficiently.

For example, given a single grab with no other information, a search for all 32 SVs over every possible code phase and carrier frequency is likely to be necessary. The size of the carrier frequency range that needs to be searched is driven by the quality of the oscillator in the GPS front end (an oscillator with a 1 ppm error leads to a 1.5 kHz error in the IF for a L1 signal) and the possible Doppler shifts on the signals (SVs observed from the surface of the Earth normally have Doppler shifts in the range +/−4 kHz, and receiver motion can increase this).

The invention makes use of one position fix (which will result in a knowledge of the satellite time clock) to reduce the processing required for other position fixes, and these may not follow the order in which the samples were recorded. There are a number of ways this can simplify the processing, and these are discussed below.

If a number of grabs are to be processed from the same device which the timestamps indicate were recorded at similar times, then the detection of a SV in one grab makes it likely that the same SV is detectable in the other grabs. Furthermore, once it is known that one SV that is present, any SVs known to be on the other side of the Earth can be excluded.

Furthermore, as the carrier frequency of a given SV changes fairly slowly, knowing the carrier frequency in one grab can be used to predict the carrier frequency in a temporally close grab, potentially restricting the size of the frequency search to be done.

Finally, if the time difference between grabs can be determined (by differencing timestamps), then depending on how accurately the difference can be determined, the position in the data message can be predicted, the position of bit edges or even the code phase from one grab; all information that makes search easier and or more reliable. In this case, timestamps based on counting cycles of the same oscillator used to drive the front-end, can provide the best results, as this timing is likely to be of high quality to start with and can be calibrated against the GPS signals.

The timestamps can enable the extrapolating of time from a previous or subsequent fix. If a fix was obtained a while ago (or a while in the future) and the time is known accurately, the time for the grab being processed can be determined by counting elapsed time as accurately as possible. One approach is to count samples from the A/D converter as it is driven by a good crystal which can be calibrated very accurately against GPS time (as a side effect of doing a velocity fix). In such cases 0.1 ppm is easy to achieve and better is possible (this corresponds to losing 1 microsecond at worst every 10 s), which means that gaps of many minutes, maybe even a few hours can be tolerated.

An approximate knowledge of position can also be used to overcome the timing ambiguity discussed above. As radio signals travel approximately 300 km in 1 ms, knowing position to within a 150 km radius means that there should be no ambiguity at all.

The processing of a group of grabs enables both relative timing and a position estimate to be used once a position fix is obtained for one of the grabs, in accordance with the invention. This additional information can then make it easier to remove timing ambiguity from the other grabs, and which may have weaker signals. An additional measure can be to deliberately record longer grabs occasionally (e.g. if there hasn't been a grab for over 1 day record 6 s, if the gap is more than 2 hrs record 1 s otherwise record 100 ms).

Figure 3:
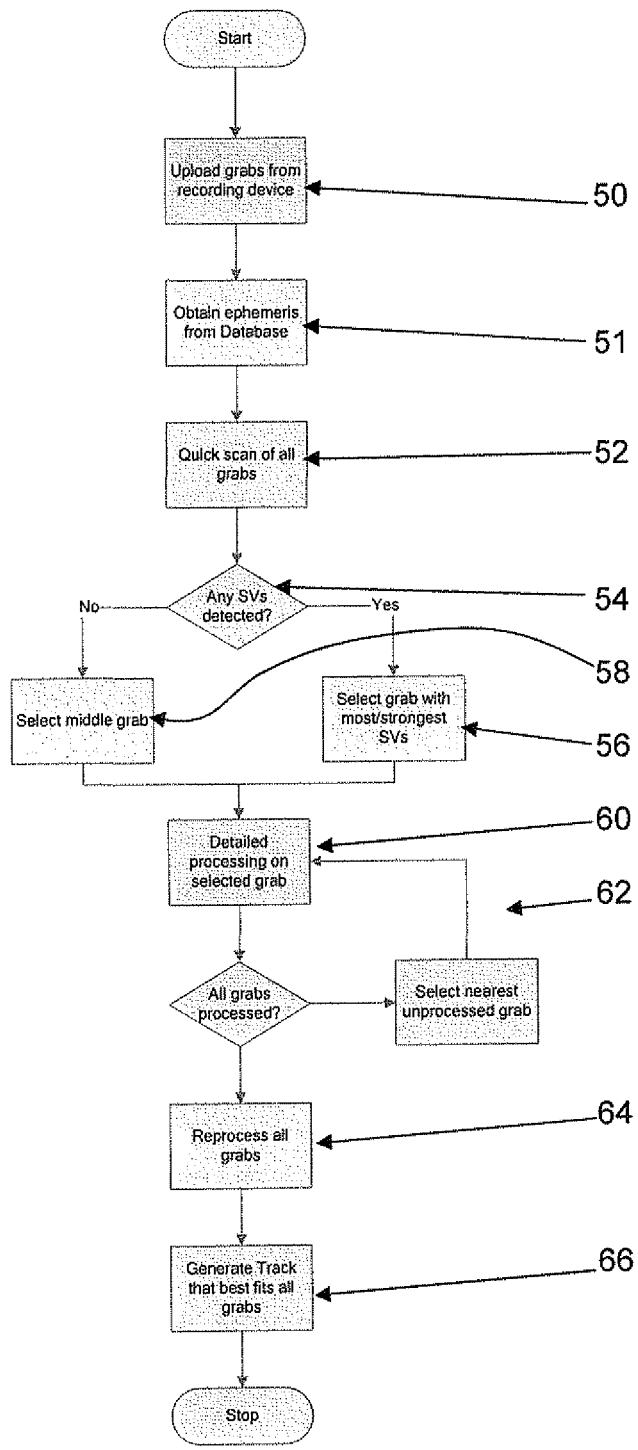
FIG. 3 shows a data processing method used in the system of the invention.

FIG. 3 shows how the processing of the recorded grabs can be implemented.

After uploading the data in step 50, ephemeris data is obtained from a database in step 51. This is discussed below, and reduces the amount of data which needs to be uploaded from the receiver.

A "quick scan of all grabs" is used first, in step 52. This involves looking for all possible SVs in all grabs but using a short integration period (e.g. 1 ms). Such a quick scan would inevitably only find strong signals (from clearly "visible" SVs), but would also require comparatively modest processing effort.

The search for a given SV is over a given range of code phases and carrier frequencies. The amount of data processed (i.e. the correlation integration period, corresponding to 1 ms in this example) is selected such that the code from a strong satellite signal can be detected, but the amount of data is less than would be desired to obtain a weaker signal. The amount of data which should be processed to obtain a weak signal will typically be at least 4 times greater.

The longer the integration, the weaker the signal that can be expected to be detected to any chosen degree of reliability. In theory, doubling the integration length increases sensitivity by 3 dB, although in practice imperfections usually mean that the full 3 dB improvement is not obtained. However doubling the length of the integration means twice as many samples to process, and thus a (rough) doubling of processing effort. In fact in some cases (e.g. coherent integration) longer integration periods also mean narrower frequency ranges, and hence processing effort can grow even faster.

By way of example, a search for all 32 SVs can be conducted with a 1 ms integration period in the same processing time that might be used to search for one SV with a 10 ms integration period. The only drawback of the 1 ms integration is that it is likely to be approximately 10 dB less sensitive, however it will be good enough to spot strong signals from high elevation SVs when there is a clear view of the sky. With a collection of grabs to process, with little a priori knowledge, it is likely to be far more efficient to do 32 1 ms integrations on each grab looking for one that provides us with one or more (strong) SVs and then use the information obtained get from them to prioritise a subsequent 10 ms integration, than it would be to use 10 ms integrations from the outset.

If SVs are detected in step 54 from the quick grabs, then the grab with the most or strongest SV signals is selected in step 56 for further processing. If no SVs are found, a middle grab is selected in step 58.

Based on the results of this "quick scan" more detailed & expensive processing is deployed in step 60, starting with the grab that has had most success so far as outlined above. This gives the best chance of getting a position/velocity fix from the first grab so processed and thus providing helpful information for the processing of other grabs.

The full processing has longer integration length.

As explained above, a single grab of 100 ms of IF data does not by itself contain enough information to calculate an unambiguous position. This is because to establish a full pseudorange, it is necessary to establish the time of transmission of the signal to a very high accuracy. Detecting the signal (i.e. getting the code phase) reveals the fine part of the time (timing within the millisecond), but as the same spreading code is repeated every millisecond, the coarse part of the time is also needed (which millisecond). The absolute GPS time is not needed, as the calculations are based on the relative time delays from the multiple satellites from which signals are received.

The database information can help resolve this ambiguity. For example, it can be assumed that the database records every data bit every GPS SV has transmitted for the last week (32 SV*50 bps*24 hrs*60 mins*60 s=~17 Mbytes), and a 100 ms grab with a timestamp is to be processed. The timestamp may have an absolute accuracy of around 1 s, but a much greater relative accuracy. 5 or 6 bit data patterns for any SVs can be detected in a short 100 ms grab, and these can be analysed to see how many times those patterns match in the database in a 2 second window (1 second either side of the nominal time, to allow for the potential inaccuracy of the timestamp). The timestamp alone, even with 1 s accuracy can give a reasonable chance of a unique match, as the absolute time can be mapped to a range of satellite positions from the satellite data stored in the database. If not, the number of possibilities is likely to be quite small. Of course the longer the grab length, the more likelihood of a pattern that matches uniquely.

Conventional GPS receivers achieve the global timing by establishing the position of the bit edge (i.e. the individual bits of the 1500 bit GPS word, which are spaced by 20 ms) and then decoding the data message for a number of seconds until parts of the message can be recognised (such as the subframe preamble and/or the handover word). In the case of a store and process later system, this prolonged processing may not be possible.

If the timestamp is not enough, establishing the bit edge position may be sufficient. In general it is unlikely that a receiver time counter will be accurate enough to provide this level of information by itself, but once accurate time information has been established for one grab, differencing timestamps between multiple grabs can give accurate enough times.

Thus, once one grab has been processed fully, the processing of subsequent grabs is simplified. Not only can the range of code phases to be searched be narrowed, but also the carrier frequency searches can be narrowed (for example if SV2 was seen with a frequency offset of +3265 Hz 2 minutes ago, it's unlikely to have moved very much in the mean time so doing a full +/−6000 Hz scan is wasteful, perhaps 3265+/−500 Hz would be sufficient).

Prediction of bit patterns can also be used and/or bit edge positions, and integrations can then be timed that take into account the expected bit edge positions.

The smaller the search range (code phase and/or carrier frequency), the greater the sensitivity/reliability of the search for a given integration length, because there is less chance of seeing a noise spike. Thus, by taking into account one fully processed grab, the sensitivity for processing other grabs (either earlier or later in time) is improved for the given grab length.

The grabs are processed in turn in loop 62 using the information from the previously processed grabs, as explained above. They can be reprocessed in step 64. This may include re-running a full correlation with more information that allows the search ranges to be narrowed further and thus increase sensitivity.

For the example of tracking a runner, a track which best fits the grabs is generated in step 66.

For the example of a runner tracking device with a grab every 10 s, the elapsed time between grabs can be measured to a few microseconds by the timestamps.

The method can provide the processing of the grabs multiple times with multiple hypotheses (for example concerning time, position, carrier frequency). If the processing fails to enable the position fixes to be obtained, the method can fall back on more conventional processing, using a cold-start type of approach.

As outlined above, the relative timing information enables a correlation function to be implemented over a narrow range of relative delay values, as the code phase is known within small boundaries.

For example, assuming at time t the precise code phase of a given SV is known to be $\phi$, then providing nothing else changes at time $t+\delta t$ the phase will be $(\phi+f\delta t)$ mod I, where f is the code frequency (1.023 MHz) and I is the code length (1023 chips). Unfortunately, in the real world three major factors make this imprecise:

1) The receiver's clock isn't perfect. If a standard real time clock (RTC) circuit and crystal is used it may even not be able to resolve the sort of microsecond times of interest. However if elapsed time is measured in terms of the IF data samples (just counting how many samples are skipped between grabs) then a fine resolution (sub-microsecond) is obtained which comes from a high quality crystal that can be calibrated against the GPS signals. This leads to timings that are accurate to better than 0.1 ppm, which means the uncertainty grows at approximately 1 microsecond per 10 s elapsed time.

2) The SVs move, so the effective code frequency is not quite 1.023 MHz. Fortunately their orbits are known, so it is possible to fairly effectively allow for this and in most cases this becomes irrelevant.

3) The user may move. It is not possible to tell the difference between two grabs taken 20 minutes apart that are in the same place or ones taken at a pair of stations connected by an express train. Radio signals move at roughly 300 m every microsecond, so user movement of 300 m is roughly equal to a clock error of a microsecond. The user can input information about their movement, or inertial sensors can be used. The user can for example use a "stationary/slow movement/fast movement" setting to assist the processing.

If the composite of error from all of the above comes to less than ~500 microseconds (half the 1 ms code period) then a more efficient search can be conducted because the code phase can be predicted from the reference point and then the search can be limited to the uncertainty, rather than requiring a blind search for all possible code phases.

A number of further measures can be taken to ensure unambiguous timing information can be obtained:

Occasional long grabs (of at least 6 s to cover a boundary between subframes) can be recorded. When processed these will contain sufficient parts of the data message to unambiguously derive GPS time.

If a position estimate is available to within approximately 100 km, then there is no position ambiguity to deal with—the relative timings of all SVs can be deduced from knowledge of the ephemeris and the approximate time (to within approximately 10 s).

A fix calculation can be done using the Doppler measurements instead of the code phases (one way of doing this is published as a Masters Thesis by Antti Lehtinen, Tampere University of Technology, http://math.tut.fi/posgroup/DopplerPositioningwithGPS.pdf). Whilst this is unlikely to be accurate enough for most applications; it can be the basis of a position estimate when approximate position is known.

A number of possible position "guesses" can be chosen in turn and the one that provides the best match can be chosen (a similar approach to this is described in U.S. Pat. No. 6,417, 801).

As explained above, in order to establish a position/velocity fix, it is necessary to obtain the precise orbital parameters of, the SVs and the errors in their on-board clocks; which is conveyed by the ephemeris data.

These are broadcast by the SVs as part of the normal data message, repeated every 30 s. Whilst it is theoretically possible to extract such data from lots of short IF grabs, in practice it is much more effective to have one or more reference stations collect the data and populate the database that can be accessed by any PC 27 that wants to process a grab. Clearly as the ephemeris (and other data) changes over time, such a database would need to keep an archive of historical data and be able to provide the appropriate entries for a given time (the ephemeris is generally valid for a 4 hour period, so only a rough sense of time is needed to extract the correct entries).

Such a database could be housed on a server 29 accessible via wired or wireless networking of some form (including the internet). It could also provide additional features such as:
Differential corrections,
Revised health info (being a historical record, it can be corrected for which SVs were healthy at which times, which isn't necessarily the same as which were transmitting that they were healthy at the time),
A relief database (providing the altitude as a function of position on the Earth's surface), which could be employed to make fixes more reliable/accurate,
Enhanced orbital models, providing more accurate SVs positions and/or longer validity periods (potentially such information could come directly from the GPS ground station's).

The techniques outlined above can be applied to many applications. The integration of GPS functionality into cameras has been widely investigated. Grabbing IF at the same time as a photo is taken can be used in order to establish the location of the photo at a later time. The system can be used for other leisure activities, such as logging of golf rounds, by grabbing IF at every stroke of a golf round (along with which club was used).

Many variants are possible for the location of the processing. The processing can be done in the recording device at a later time (e.g. when external power is available and/or when connection to an ephemeris server is possible). The processing can be implemented in a server 29 rather than the user's PC 27 and the results returned to the user's PC. The processing can be effected in a printer or print booth (especially for grabs associated with photos) rather than a users PC.

The use of a database can be avoided if one or more grabs are made long enough to contain all the necessary ephemeris data. Most of the contents of subframes 1,2 and 3 are required, so that if a grab catches the right 15 s, this could provide all the required information. In the worst case (if the grab starts at the wrong moment just when ephemeris data is changing, which happens once every 2 hrs normally) around 45 s may be needed.

The invention is generally applicable to most forms of store and process GPS systems, not only the examples of cameras and sports mentioned above. Other examples are pet tracking, asset tracking, and security applications. The invention has been described, in connection with single frequency GPS, but other GNSS systems (GLONASS, Galileo etc) would be similar. Indeed the techniques could also be applied to multiple frequency systems, with appropriate means of capturing the IF data from each carrier.

Various other modifications will be apparent to those skilled in the art.

We claim:

1. A method of processing signals from a satellite positioning system, comprising:
   (50) receiving from a storage device (20) recorded blocks of data samples of a satellite broadcast, each block including one or more timestamps generated within a receiver at which the samples were recorded;
   (52) processing by a computer the recorded blocks of data samples to identify satellite transmissions contained within the blocks, comprising performing a correlation operation using a first integration period;
   based on the satellite transmissions identified as a result of the processing, selecting (56,58) one of the blocks;
   (60) processing by the computer the selected block to derive at least position and satellite broadcast timing information, comprising performing a correlation operation with a second integration period,
   wherein the first integration period is shorter than the second integration period; and
   using the timestamp of the selected block and the timing information obtained from the selected block to assist in the processing (60), by the computer, of the other blocks.

2. A method as claimed in claim 1, wherein using the timestamp of the selected block and the timing information obtained from the processing of the selected block comprises predicting the timing information for the other blocks using the relative timing between the timestamps of the selected block and the other blocks.

3. A method as claimed in claim 1, further comprising using the position information obtained from the processing of the selected block to predict the approximate location at which the other blocks were recorded and using this to simplify the processing of the other blocks.

4. A method as claimed in claim 1, wherein processing the selected block to derive at least the position and satellite broadcast timing information also derives the satellite broadcast frequency, and wherein the method further comprises predicting the satellite broadcast frequency for the other blocks from the derived frequency for the selected block.

5. A method as claimed in claim 1, wherein the processing of each other block of data uses the timestamp of one or more previously processed blocks of data and the corresponding position and timing information to assist in the processing.

6. A method as claimed in claim 1, wherein the samples comprise intermediate frequency downconverted data samples.

7. A method as claimed in claim 1, wherein the shorter integration period has a duration less than 5 ms.

8. A method as claimed in claim 1, wherein the satellite broadcast data comprise CDMA data, with each satellite broadcasting a signal encoded with a repeating code having a code duration, wherein the shorter integration period has a duration of 2 or less code durations.

9. A method as claimed in claim 1, wherein the first integration period is less than ¼ of the second integration period.

10. A method as claimed in claim 1, wherein each recorded block of samples has a duration of less than 500 ms.

11. A method as claimed in claim 1, wherein the processing of the samples comprises accessing a database to obtain ephemeris information at times corresponding to the timestamps.

12. A method as claimed in claim 1, wherein the selected block of samples is not the first recorded block of samples.

13. A method of processing signals from a satellite positioning system, according to claim 1 wherein the storage device is disposed within the receiver, the method further comprising:
- (32) recording the blocks of data samples of the satellite broadcast in the storage device;
- (32) generating, using a timer, the one or more timestamps.

14. A method as claimed in claim 13, wherein the satellite broadcast comprises CDMA data, with each satellite broadcasting a signal encoded with a repeating code having a code duration, wherein the blocks of data samples have a duration of 50 to 500 code durations.

15. A method of processing signals from a satellite positioning system according to claim 1 wherein the computer is disposed within the receiver.

16. A method of processing signals from a satellite positioning system according to claim 1 wherein the computer is disposed within a server.

17. A method as claimed in claim 1, wherein each recorded block of samples has a duration of less than 250 ms.

* * * * *